United States Patent [12]
Ishii

(10) Patent No.: US 12,413,803 B2
(45) Date of Patent: Sep. 9, 2025

(54) REPRODUCTION DEVICE, TIME CORRECTION METHOD, AND PROGRAM

(71) Applicant: Sharp NEC Display Solutions, Ltd., Tokyo (JP)

(72) Inventor: Eisaku Ishii, Tokyo (JP)

(73) Assignee: Sharp NEC Display Solutions, Ltd., Tokyo (JP)

( * ) Notice: Subject to any disclaimer, the term of this patent is extended or adjusted under 35 U.S.C. 154(b) by 484 days.

(21) Appl. No.: 17/897,616

(22) Filed: Aug. 29, 2022

(65) Prior Publication Data
US 2022/0417584 A1 Dec. 29, 2022

Related U.S. Application Data

(63) Continuation of application No. PCT/JP2020/009671, filed on Mar. 6, 2020.

(51) Int. Cl.
*H04L 7/00* (2006.01)
*H04N 21/43* (2011.01)

(52) U.S. Cl.
CPC ........... *H04N 21/4302* (2013.01); *H04L 7/00* (2013.01)

(58) Field of Classification Search
CPC ....................................................... H04L 7/00
See application file for complete search history.

(56) References Cited

U.S. PATENT DOCUMENTS

| 7,130,368 B1 * | 10/2006 | Aweya .................. H03L 7/0992 713/400 |
| 2018/0224884 A1 | 8/2018 | Oshima |
| 2019/0141376 A1 | 5/2019 | Kumetani |

FOREIGN PATENT DOCUMENTS

| JP | H11-202972 A | 7/1999 |
| JP | 2009-052968 A | 3/2009 |
| JP | 2018-085671 A | 5/2018 |
| JP | 2018-124241 A | 8/2018 |
| JP | 2019-086989 A | 6/2019 |

OTHER PUBLICATIONS

"Ntpd4 Daemon". AIX Version 7.1 Commands Reference, vol. 4, n-r, IBMJapan, Ltd., 2018.
International Search Report (ISR) (PCT Form PCT/ISA/210), in PCT/JP2020/009671, dated Jun. 2, 2020.

* cited by examiner

*Primary Examiner* — Michael H Hong
(74) *Attorney, Agent, or Firm* — McGinn I.P. .Law Group, PLLC

(57) ABSTRACT

A signage player includes: a time function configured to count an internal device time. The signage player also includes a time correction calculator configured to acquire a reference time from the outside, for example, an NTS server, at a timing determined in advance and synchronize the internal device time with the reference time; and a time corrector configured to calculate a time correction coefficient defined using a change rate of a time difference, an error change rate (Δ) between the reference time and the internal device time at a timing different from the timing determined in advance and calculate a corrected time acquired by correcting the internal device time using the time correction coefficient.

8 Claims, 7 Drawing Sheets

REPRODUCTION DEVICE, TIME CORRECTION METHOD, AND PROGRAM

TECHNICAL FIELD

The present invention relates to a reproduction device, a time correction method, and a program.

BACKGROUND ART

Devices reproducing and outputting content called signage players are installed at various places, and content distributed through a network is displayed in display units of the signage players or external display devices. In the signage players, in order to start and end content at accurate times, accurate clocks need to be maintained. In order to constantly maintain the time accurately, for example, with a short interval of about 10 seconds, it is necessary to acquire an accurate time from an NTP server and continue to constantly perform time correction.

In addition, in order to synchronize content transformation timings among a plurality of signage players, a device and the like for controlling content transformation need to be provided externally. For example, technologies for synchronizing an internal time in a device with a predetermined reference time have been disclosed in Patent Literatures 1 to 4.

CITATION LIST

Patent Literature

[Patent Literature 1]
Japanese Unexamined Patent Application, First Publication No. 11-202972
[Patent Literature 2]
Japanese Unexamined Patent Application, First Publication No. 2009-052968
[Patent Literature 3]
Japanese Unexamined Patent Application, First Publication No. 2018-085671
[Patent Literature 4]
Japanese Unexamined Patent Application, First Publication No. 2018-124241

SUMMARY OF INVENTION

Technical Problem

As described above, in a system in which an NTP server is frequently accessed for time correction, in a case in which many signage players are disposed within the same network, the network load increases, and as a result, there is a problem in that an error in time synchronization increases.

In addition, in a case in which signage players are configured using inexpensive hardware, processing capacities thereof are frequently not high, and there is also a problem in that the burden of time synchronization processing has an influence on reproduction of content.

Furthermore, when synchronization with an NTP server is taken with an interval of about one hour, values corrected in instance of time correction have a difference of several tens of millimeters or more, and, when the same content is reproduced using a plurality of signage players, there is also a problem in that a difference of several frames occurs.

A technology for solving the problems described above is not disclosed in any of Patent Literatures 1 to 4 described above, and a new technology has been requested.

The present invention is in view of the situations described above, and an object thereof is to suppress a load accompanying access to a device providing an external reference time.

Solution to Problem

According to the present invention, there is provided a reproduction device including: a timer configured to count an internal device time; a time correction calculator configured to acquire a reference time from the outside at a timing determined in advance and synchronize the internal device time with the reference time; and a time corrector configured to calculate a time correction coefficient defined using a change rate of a time difference between the reference time and the internal device time at a timing different from the timing determined in advance and calculate a corrected time acquired by correcting the internal device time using the time correction coefficient.

According to the present invention, there is provided a time correction method performed by a reproduction device, the time correction method including calculating a corrected time of an internal device time of the display device using a time correction coefficient determined using a change rate of a time difference between a reference time and the internal device time.

According to the present invention, there is provided a program executed in a reproduction device, the program having a function of calculating a corrected time of an internal device time of the display device using a time correction coefficient determined using a change rate of a time difference between a reference time and the internal device time.

Advantageous Effects of Invention

According to the present invention, a reproduction device that suppresses a load accompanying access to a device providing an external reference time is provided.

DESCRIPTION OF EMBODIMENTS

Hereinafter, an embodiment of the present invention will be described with reference to the drawings. In all the drawings, similar reference signs are assigned to similar constituent elements, and description thereof will be omitted as is appropriate.

Overview of Embodiment

Figure 1:
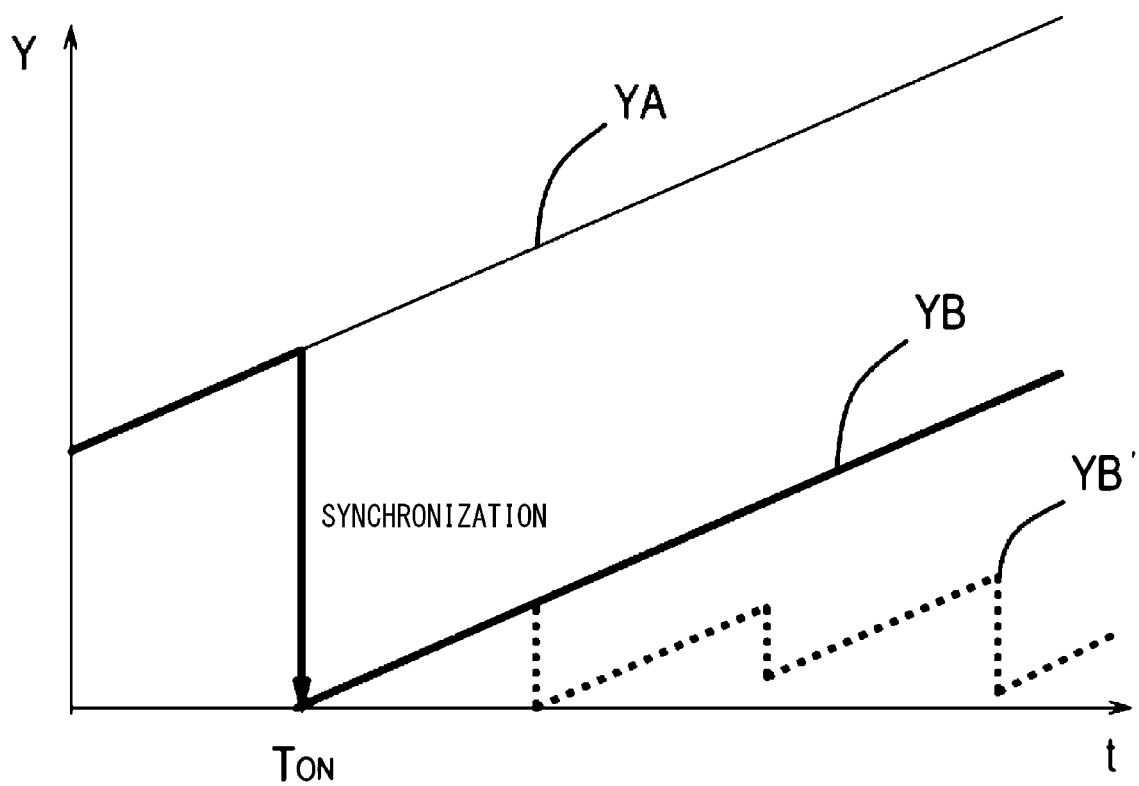
FIG. 1 illustrates graphs representing transitions of an error Y of a time inside a device with respect to a reference time of an NTP server.

Features of a signage player (one example of a reproduction device) will be described with reference to FIG. 1. FIG. 1 illustrates graphs representing transitions (YA, YB, and YB') of an error Y of an internal device time T with respect to a reference time t of an NTP server. Hereinafter, time information acquired from an NTP server will be referred to as a "reference time."

An error transition YA illustrates an example in which a process of synchronization between an internal device time T of the signage player 1 (see FIG. 2) and an NTP server (that is, a reference time t) is not performed.

An error transition YB (a thick line) illustrates an example in which a process of synchronization between an internal device time T of the signage player 1 and an NTP server (the reference time t) is performed at the time of turning power on, and thereafter the synchronization process is not performed.

An error transition YB' (a broken line) illustrates an example in which a process of synchronization between an internal device time T of the signage player 1 and an NTP server is performed at the time of turning power on, and thereafter the synchronization process is regularly performed.

In description of this embodiment, "at the time of turning power on" represents a timing at which an operation of turning power on is performed. "At the time of turning power off" represents a timing at which an operation of turning power off is performed.

As described above, in a case in which a frequent synchronization process is performed, like the error transition YB', the synchronization process may end without being completed due to a response delay from the NTP server (the reference time t) according to a content reproduction process using the signage player 1 and an increase in the network load and the like, and an error may remain.

Thus, in this embodiment, as illustrated in the error transition YB, a synchronization process is performed at the time of power on T$_{ON}$, and an error between the NTS server (that is, the reference time t) and the internal device time T is set to "0" once. Thereafter, when the synchronization process is frequently performed, as illustrated in the error transition YB' (the broken line), an error may remain. Thus, in this embodiment, after the synchronization process is performed once, a synchronization process between the internal device time T and the reference time t is not performed, a corrected time T' is calculated every predetermined time (for example, every one second), and a content reproduction process is performed (particularly, determination of a reproduction start timing and synchronization of a start timing with another signage player 1) on the basis of the corrected time T'.

Here, in a case in which a "predetermined time" is counted by the internal device time T (that is, an internal clock), a time error Y accompanying an error between the internal device time T and the NTP server (the reference time t) occurs. Thus, the corrected time T' described above is calculated using a time correction coefficient G including an error change rate Δ between the internal device time T and the NTP server (the reference time t). In this way, by performing control of a content reproduction timing to be the corrected time T' while the synchronization process of the internal device time T is suppressed to a minimum (for example, once), a timing of content reproduction is realized with high accuracy.

<Configuration of Signage Player 1>

Figure 2:
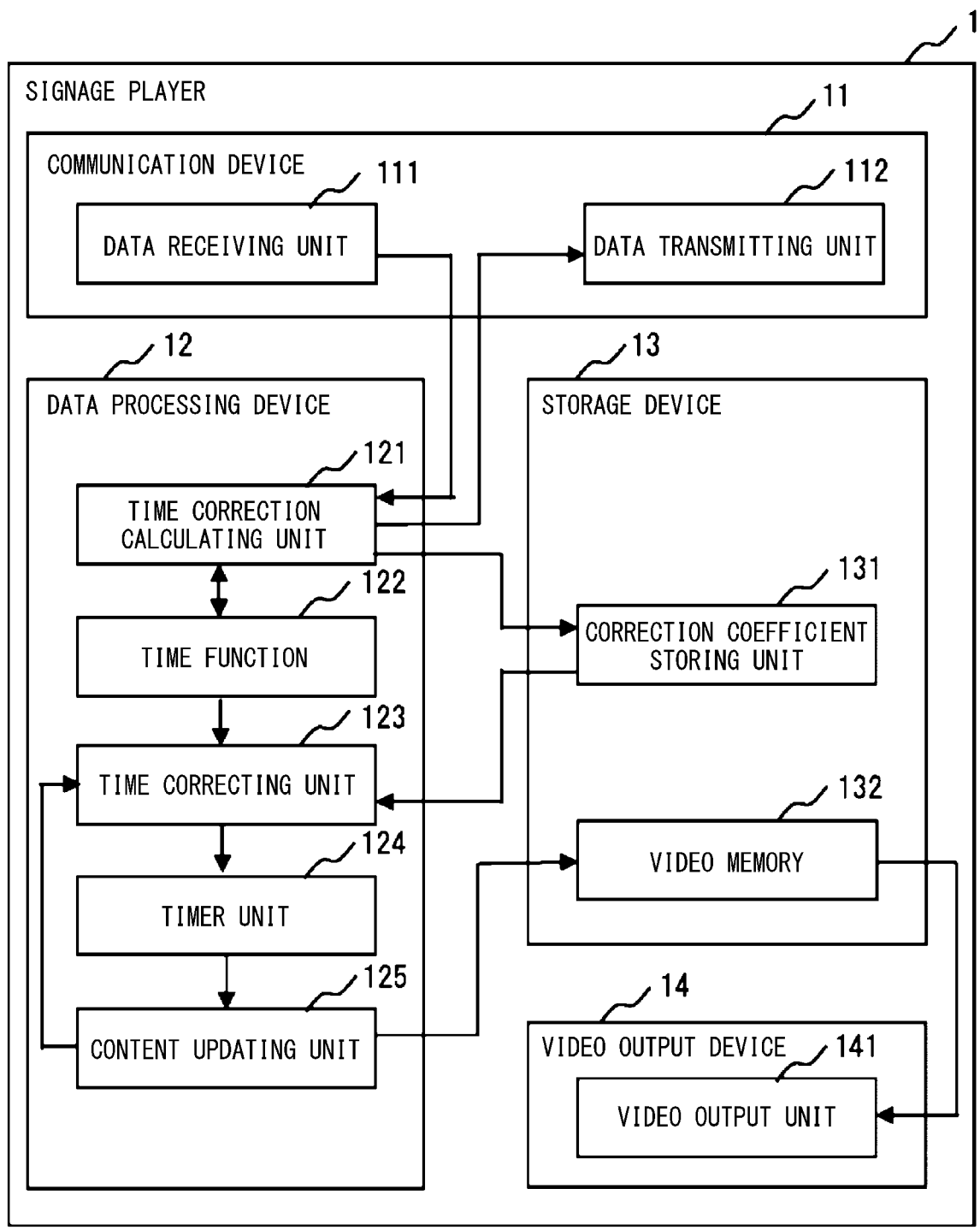
FIG. 2 is a block diagram illustrating a schematic configuration of a signage player according to an embodiment.

FIG. 2 is a block diagram illustrating a schematic configuration of the signage player 1 according to this embodiment.

The signage player 1 includes a communication device 11, a data processing device 12, a storage device 13, and a video output device 14. In addition, the signage player 1 may be configured not to include the video output device 14 but configured as a device outputting content on an external display device.

Although not illustrated, the signage player 1 includes a main control unit that performs overall control of each constituent element of the signage player 1 and a power supply unit that performs power supply/management by being connected to an external power supply or using an internal battery.

In addition, each constituent element of the signage player 1 is realized using hardware (an arithmetic operation unit such as a CPU or an MPU, a memory such as a ROM or a RAM, a storage such as an HDD or an SDD, and the like) and a program corresponding to respective functions.

The communication device 11 is a general communication IF such as a wired LAN or a wireless LAN and communicates with various external devices. More specifically, the communication device 11 includes a data receiving unit 111 and a data transmitting unit 112.

The data receiving unit 111 acquires a reference time t from the NTP server and acquires content to be displayed by the signage player 1 and various kinds of control information (information such as a start time, an end time, and the like of content reproduction) relating to content display from an external predetermined device.

The data transmitting unit 112 transmits various kinds of information to the NTP server and other external devices and requests data from the NTP server and the other external devices.

The data processing device 12 includes a time correction calculating unit 121, a time function 122, a time correcting unit 123, a timer unit 124, and a content updating unit 125.

The time function 122 counts and manages an internal device time T.

The time correction calculating unit 121 acquires a reference time t from the NTP server through the data transmitting unit 112 and the data receiving unit 111 and sets the reference time t in the time function 122 (that is, the internal device time T). In other words, the time correction calculating unit 121 synchronizes the internal device time T of the time function 122 with the reference time t. In addition, the synchronization process is performed only when the signage player 1 starts to operate (more specifically, at a timing at which a power-on operation is performed), and unless an event such as occurrence of an error occurs, the synchronization process is not performed in a power-on period after that (in other words, a period until a power-off operation is performed).

The time correcting unit 123 calculates an error change rate Δ and determines a corrected time calculating equation in which the error change rate Δ is reflected. In addition, the time correcting unit 123 provides the corrected time T' calculated using the corrected time calculating equation for a content output process (mainly, determination of a reproduction start timing).

The predetermined timing is, for example, for every second and is counted using a timer of the timer unit 124 to be described below.

The error change rate Δ is a coefficient representing a rate of increase in the error Y and represents a degree to which the internal device time T moves away from the reference time t. A method for calculating the error change rate Δ will be described below.

The timer unit 124 has an internal clock such as a crystal oscillator and performs a timer operation with predetermined accuracy (error). The timer unit 124 does not necessarily have high accuracy, which may consequently lead to an error between the internal device time T and the reference time t. Thus, in this embodiment, a content output process based on a timer operation is performed using a corrected time T' in which the error change rate Δ described above is reflected and achieves optimization of a content output timing.

The content updating unit 125 determines whether or not there is content to be updated at a predetermined timing based on a timer operation performed by the timer unit 124. In a case in which there is content to be updated, the content updating unit 125 updates a video output by writing new content into a video memory 132.

The storage device 13 includes a correction coefficient storing unit 131 and a video memory 132.

The correction coefficient storing unit 131 stores the error change rate Δ and a time difference Y. For the time difference Y, the reference time t and the internal device time T for acquiring the time difference are also stored. In addition, the time difference Y becomes "0" at the timing of a synchronization process once, and thus data before the synchronization process may be deleted when it is unnecessary.

The video memory 132 stores content to be displayed.

The video output device 14 includes a video output unit 141 and displays content written into the video memory 132.

<Operation of Signage Player 1>
<Operation Overview>

An overview of an operation performed by the signage player 1 having the configuration described above will be described focusing on a synchronization process and a time correction process and a content reproduction process based thereon. In addition, in this embodiment, the processes at the time of starting the operation for the first time and the processes at the time of starting the operation for the second time and subsequent times are partially different, and thus each process will be separately described.

<Basic Operation>

When the power of the signage player 1 is on, in other words, at a power-on time $T_{ON}$, the time correction calculating unit 121 acquires a reference time t from the NTP server through the communication device 11 (the data receiving unit 111 and the data transmitting unit 112) and performs a time setting process using the reference time t, more specifically, a process of synchronization between the internal device time T managed by the time function 122 and the reference time t. In other words, a time difference $Y_{ON}$ between the reference time t and the internal device time T of the time function 122 is calculated, and the internal device time T of the time function 122 is changed such that the time difference $Y_{ON}$ becomes "0."

This synchronization process is performed only at a timing at which the power supply unit 151 is turned on, and, basically, the synchronization process is not performed again during a normal operation (in other words, a period until a power-off operation is performed). In other words, the signage player 1 does not perform the time synchronization process during content reproduction and updating. In addition, the timing of the synchronization process is not meant to be limited to the time of turning the power supply unit 151 on but may be a predetermined timing at which there is no influence of content reproduction/update and the network load, for example, a timing that is several minutes after power on at which the operation of the signage player 1 becomes stable or the like.

In addition, it is known that there is a likelihood of the reference time t transmitted from the NTP server having a maximum error of several tens of milliseconds. Thus, when the time difference Y is calculated, for example, instead of calculating the time difference by acquiring the reference time t once, the reference time t may be acquired several times to calculate a plurality of time differences Y, and an average thereof may be set as the time difference Y.

<Operation at Time of First Start of Operation (First Day)>

An operation at the time of the first start of operation will be described with reference to FIGS. 3 and 4.

When the power of the signage player 1 turns on (S10), the time correction calculating unit 121 acquires a power-on time $t_{ON1}$ that is the current time based on the reference time t from the NTP server through the data transmitting unit 112 and the data receiving unit 111 (S11) and performs a synchronization process of causing the reference time t to coincide with the internal device time T of the time function 122 (S12).

In addition, the time correcting unit 123 calculates a time difference $Y_{ON1}$ between the current time tom and the internal device time Tom (S13) and stores data ($t_{ON1}$, $Y_{ON1}$) in the correction coefficient storing unit 131 (S14). Furthermore, in accordance with the synchronization process, $t_{ON1}=T_{ON1}$, and thus the time difference $Y_{ON1}$ at this time is "0."

Here, since the error change rate Δ stored at the power-off time of the previous time in the correction coefficient storing unit 131 is not present, the time correcting unit 123 determines a corrected time calculating equation represented in the following Equation (1-1) (S15).

$$T'=T \qquad \text{Equation (1-1)}$$

T: internal device time (after synchronization)
T': corrected time

Figure 3:
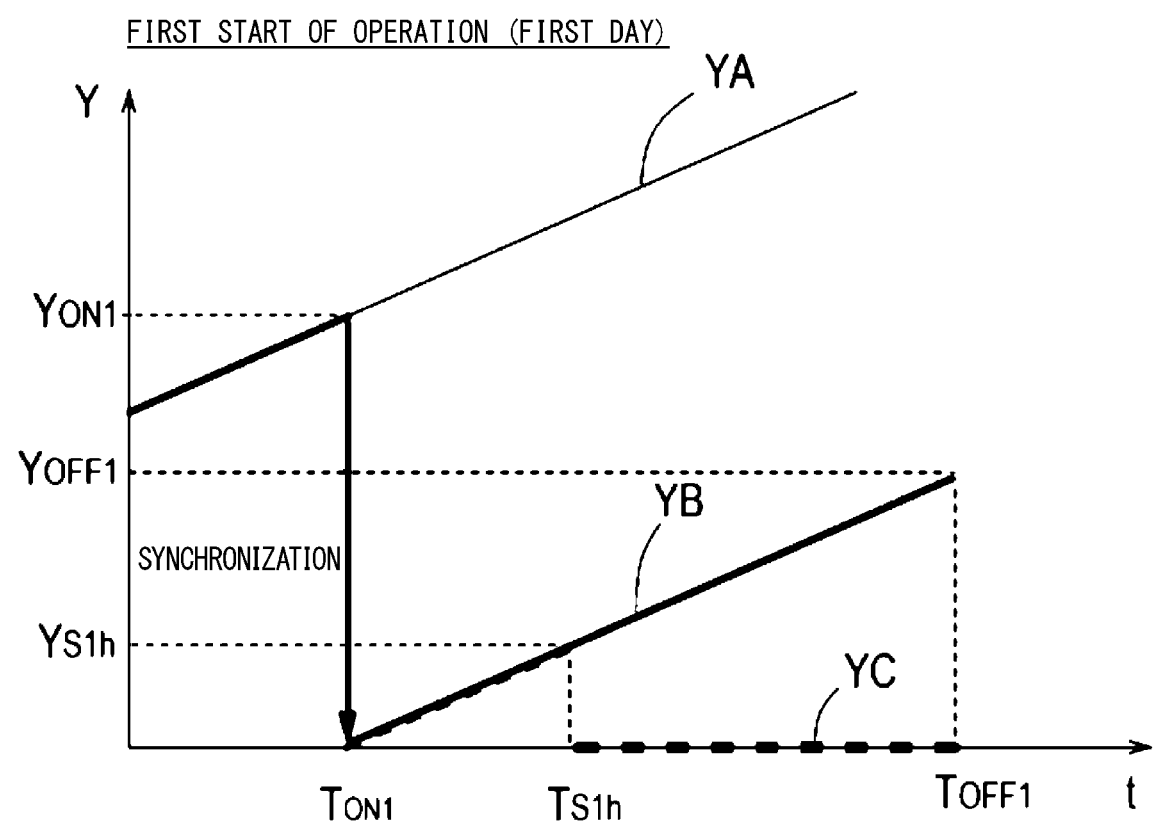
FIG. 3 is a graph illustrating a transition in an error at the time of a first-time operation according to an embodiment.

In other words, as illustrated in FIG. 3, an error transition YC between the corrected time T' and the reference time tin time $t_{ON1}$ ($T_{ON1}$) to time $T_{S1h}$ coincides with the error transition YB of the internal device time T.

At the first start of the operation, as described above, an error change rate Δ based on an actual operation is not present. Thus, at the first start of the operation, a process of acquiring a time $T_{S1h}$ from the NTP server after a predetermined time (in this embodiment, after one hour) from the start of the operation and calculating a change rate of the error during that time as an error change rate $\Delta_1$ (a $\Delta_1$ calculating/updating process) is performed. In addition, a content output process is performed during that time.

First, the time correcting unit 123 sets a $\Delta_1$ update timer to one hour and causes a timer operation using the timer unit 124 to start (S16). At the same time, the content updating unit 125 performs a content output process based on timer operation control (S17). A specific process of the content output process based on the timer operation control will be described in detail with reference to a flowchart of FIG. 7 and thus will be described here briefly. In other words, the timer is started with a timer time (for example, one second) set, and the content output process is performed. For example, when the timer time set to one second is counted up, the time correcting unit 123 checks presence/absence of a content update. In a case in which there is no content to be updated, in other words, in a case in which the content output process up to now is continued, a corrected time T' is calculated at a timing at which the timer time (here, one second) has elapsed, and a timer operation having this time as a reference and having one second as the timer time is performed again. In a case in which there is a content to be updated, the corrected time T' is calculated similarly to the description presented above, and the content is set to be output at a time set as an update time of the content using the corrected time T'.

The time correcting unit 123 monitors a timer count and determines whether or not it is an update timing of the error change rate $\Delta_1$, in other words, whether or not one hour has elapsed (S18). In a case in which it is not the update timing (No in S18), the content output process (S17) and the timer count monitoring process (S18) are continued.

When one hour elapses, and it is an update timing (Yes in S18), the time correcting unit 123 performs a process of updating the error change rate $\Delta_1$. More specifically, the following is performed.

First, the time correcting unit 123 acquires a current time (a time $t_{S1h}$ at which one hour has elapsed from a power-on time $t_{ON}$ ($T_{ON1}$)) from the NTP server and calculates an error $Y_{S1h}$ ($=T_{S1h}-t_{S1h}$) between the internal device time $T_{S1h}$ at that time and the time $t_{S1h}$.

Next, the time correcting unit 123 calculates and updates the error change rate $\Delta_1$ using the following Equation (1-2A) (S19).

$$\Delta_1 = Y_{S1h}/(t_{S1h} - t_{ON1}) \qquad \text{Equation (1-2A)}$$

Thus, a relation between the internal device time T and the reference time t is represented using the following Equation (1-2B).

$$T - T_{S1h} = \Delta_1 \times (t - t_{S1h}) \qquad \text{Equation (1-2B)}$$

In addition, at this timing, in the signage player 1, a content reproduction process is performed, and the internal device time T counted by the time function 122 is not synchronized with an effect of the load of the synchronization process taken into account.

Here, a process of calculating the corrected time T' such that it coincides with the reference time t is performed on the basis of the internal device time T. In other words, the corrected time T' is calculated by substituting the reference time t of Equation (1-2B) described above with the corrected time T'. The time correcting unit 123 calculates the corrected time calculating equation (the corrected time T') as the following Equation (1-3) using the updated error change rate $\Delta_1$ (S20).

$$T - T_{S1h} = \Delta_1 \times (T' - t_{S1h})$$

$$T' = (T - T_{S1h}=)/\Delta_1 + t_{S1h} \qquad \text{Equation (1-3)}$$

In this way, differently from the error transition YB of the internal device time illustrated in FIG. 3, the error transition YC (a broken line in the drawing) of the corrected time T' transitions to "0."

In addition, by acquiring the reference time t from the NTP server several times, taking an average value, and the like, the accuracy of time acquisition can be improved. In this embodiment, although the error change rate $\Delta_1$ has been described as being acquired after one hour, in consideration of a display difference at the time of displaying the same content in a plurality of signage players 1 and the like, it is preferable to perform correction when the time difference Y (error) between the reference time t and the internal device time T is Y<±20 ms.

Thereafter, similar to the process of S17 described above, the content updating unit 125 performs a content output process based on timer operation control (S21). In addition, the time correcting unit 123 monitors whether or not a power-off operation has been performed (S22), and the content output process is continued in a case in which there is no power-off operation (No in S22) (S21).

In a case in which the power-off operation is performed (Yes in S22), a process of calculating an error change rate $\Delta_2$ used at the time of next start of the operation is performed (S23 to S25).

More specifically, in a case in which the power-off operation is performed (Yes in S22), the time correction calculating unit 121 acquires a time $t_{OFF1}$ from the reference time t of the NTP server. In addition, the time correcting unit 123 calculates an error $Y_{OFF1}$ between the internal device time T at that time and the reference time $t_{OFF1}$ (S24).

Then, the time correcting unit 123 acquires an error change rate $\Delta'_1$ from the previous synchronization process to the time of power off from data of two points that are two points ($t_{ON1}$, 0) and ($t_{OFF1}$, $Y_{OFF1}$) at the time of power on and at the time of power off and stores the acquired error change rate in the correction coefficient storing unit 131 as an error change rate $\Delta_2$ of the time correction coefficient G to be used at the second day (S25).

$$\Delta'_1 (=\Delta_2) = Y_{OFF}/(t_{OFF} - t_{ON1})$$

In addition, at the first day, it may be assumed that the processing load becomes high after power on, and stable points ($t_{ON1}$, $Y_{ON1}$) cannot be calculated. In such a case, instead of the point ($t_{ON1}$, 0) of the power-on time, a point ($t_{S1h}$, $Y_{S1h}$) of one hour after power-on may be used.

When corrected time calculating equations of the corrected time T' of the first day can be arranged as below.

(1) Between power on and one hour later $$T' = T$$

(2) Between after one hour and power off $$T' = (T - T_{S1h}=)/\Delta_1 + t_{S1h}$$

$$\Delta_1 = \Delta 1 = Y_{S1h}/(t_{S1h} - t_{ON1})$$

(3) Error change rate $\Delta'_1$ ($=\Delta_2$) for next time start of operation calculated at power-off time $$\Delta'_1 = Y_{OFF}/(t_{OFF} - t_{ON1})$$

t: reference time
T: internal device time
T': corrected time
$t_{ON1}$: power-on time
$t_{S1h}$: time one hour after power on
$t_{OFF1}$: power-off time
$Y_{S1h}$: error between internal device time $T_{S1h}$ at time point of one hour after power on and reference time $t_{S1h}$
$Y_{OFF1}$: error between internal device time $T_{OFF1}$ at power-off time and reference time $t_{OFF1}$ Description of the operation at the first start of the operation (first day) has been presented as above.

<Operation at N-th Start of Operation (The Second Day and After That)>

Figure 5:
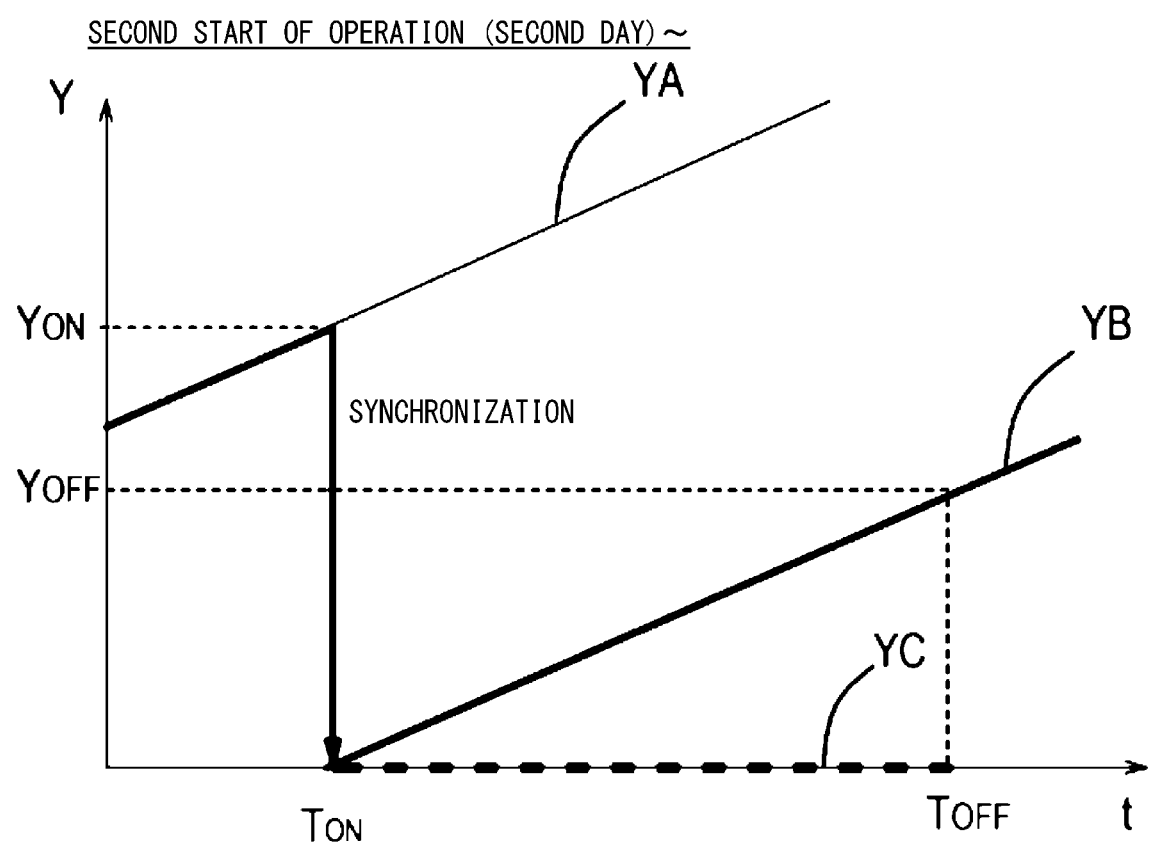
FIG. 5 is a graph illustrating a transition in an error of the N-th day according to an embodiment.
Figure 6:
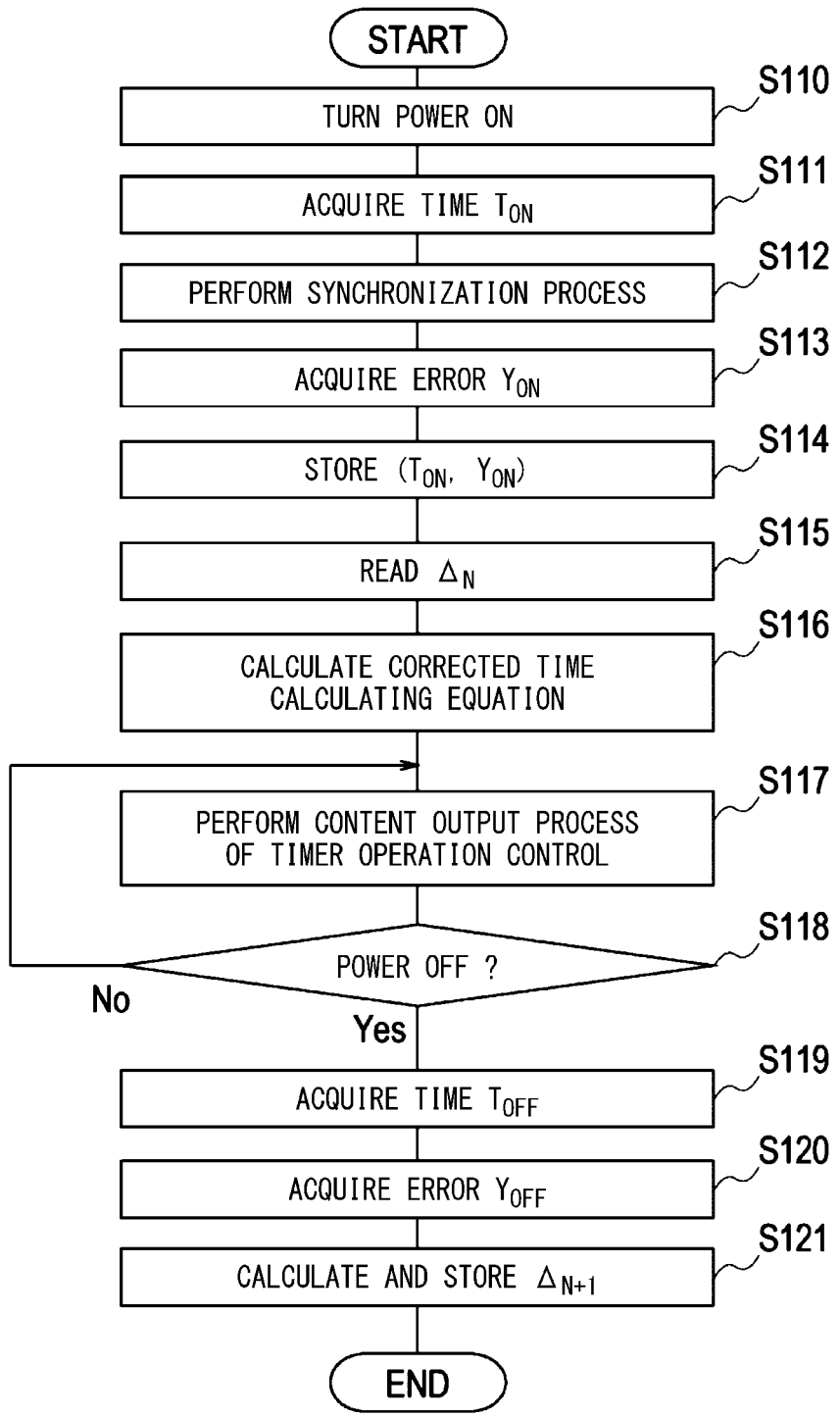
FIG. 6 is a flowchart illustrating a synchronization process and a time correction process of the N-th day according to an embodiment.

Next, an operation at the N-th start of the operation (the second day and after that) will be described with reference to FIGS. 5 and 6.

<Operation at N-th Day>

The operation at the N-th day will be described with reference to FIGS. 5 and 6.

At the time of the start of the operation at the N-th day, similar to the operation at the first start of the operation, when the power of the signage player 1 becomes on (S110), the time correction calculating unit 121 acquires a power-on time $t_{ON}$ that is the current time based on the reference time t from the NTP server through the data transmitting unit 112 and the data receiving unit 111 (S111) and performs a synchronization process of causing the reference time t to coincide with the internal device time T of the time function 122 (S112).

At this time, the time correcting unit 123 calculates a time difference $Y_{ON}$ between the reference time $t_{ON}$ and the internal device time $T_{ON}$ of the time function 122 (S113) and stores data ($t_{ON}$, $Y_{ON}$) in the correction coefficient storing unit 131 (S114). In addition, the synchronization process is performed, and $t_{ON}=T_{ON}$, and thus the time difference $Y_{ON}=0$, in other words, data ($t_{ON}$, $Y_{ON}$)=($t_{ON}$, 0).

Furthermore, the time correcting unit 123 reads the error change rate $\Delta_N$ stored in the correction coefficient storing unit 131 at the previous day (S115) and calculates a corrected time calculating equation of the corrected time T1' that is used thereafter until power off using the following Equation (N1) (S116).

$$T'-T_{ON}=(T'-t_{ON})/\Delta_N$$

$$T'=(T-t_{ON})/\Delta_N+T_{ON} \quad \text{Equation (N1)}$$

Here, $T_{ON}=t_{ON}$

Figure 4:
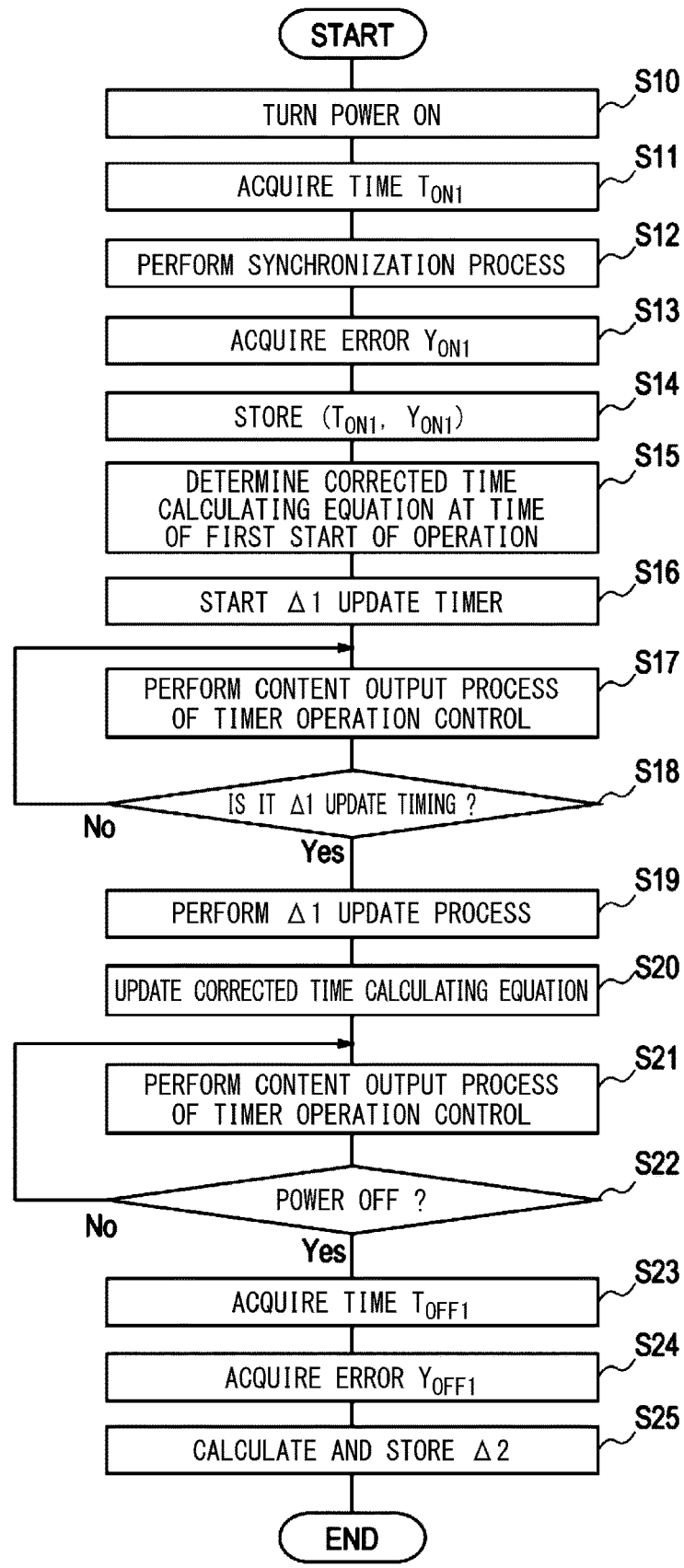
FIG. 4 is a flowchart of a synchronization process and a time correction process at the time of a first-time operation according to an embodiment.

When the corrected time calculating equation is determined, similar to S17 and S21 at the time of the first start of the operation illustrated in FIG. 4, until a content output process according to timer operation control is performed (S117), and a power-off operation is performed (No in S118), the content output process according to the timer operation control is continued (S117). The content output process according to the timer operation control will be described below.

When the power-off operation is performed (Yes in S118), the time correction calculating unit 121 acquires a time $t_{OFF}$ that is the reference time t of the NTP server (S119) and calculates an error $Y_{OFF}$ (=$T_{OFF}-t_{OFF}$) between the internal device time $T_{OFF}$ and the reference time $t_{OFF}$ (S120).

In addition, the time correcting unit 123 acquires an error change rate $\Delta'_N$ at a power-off time from data ($t_{ON}$, 0), ($t_{OFF}$, $Y_{OFF}$) of two points at the power-on time and the power-off time using the following Equation (N2).

$$\Delta'_N=Y_{OFF}/(t_{OFF}-t_{ON}) \quad \text{Equation (N2)}$$

Furthermore, the time correcting unit 123 reflects the change rate $\Delta_N$ used at the N-th day and stores the change rate as an error change rate $\Delta_{N+1}$ that is a time correction coefficient G to be used at the (N+1)-th day in the correction coefficient storing unit 131 (S121). At this time, as represented in the following Equation (N3), calculation is performed such that an error change rate $\Delta_{N-1}$ of the past (for example, (N−1)-th day that is the previous day) is reflected using a weighting coefficient w. For example, the weighting coefficient w is about 0.2.

$$\Delta_N+1=w\Delta'_N+(1-w)\Delta_{N-1} \quad \text{Equation (N3)}$$

Description of the synchronization process and the time correcting process of the N-th day has been presented as above.

<Content Output Process According to Timer Operation Control>

Figure 7:
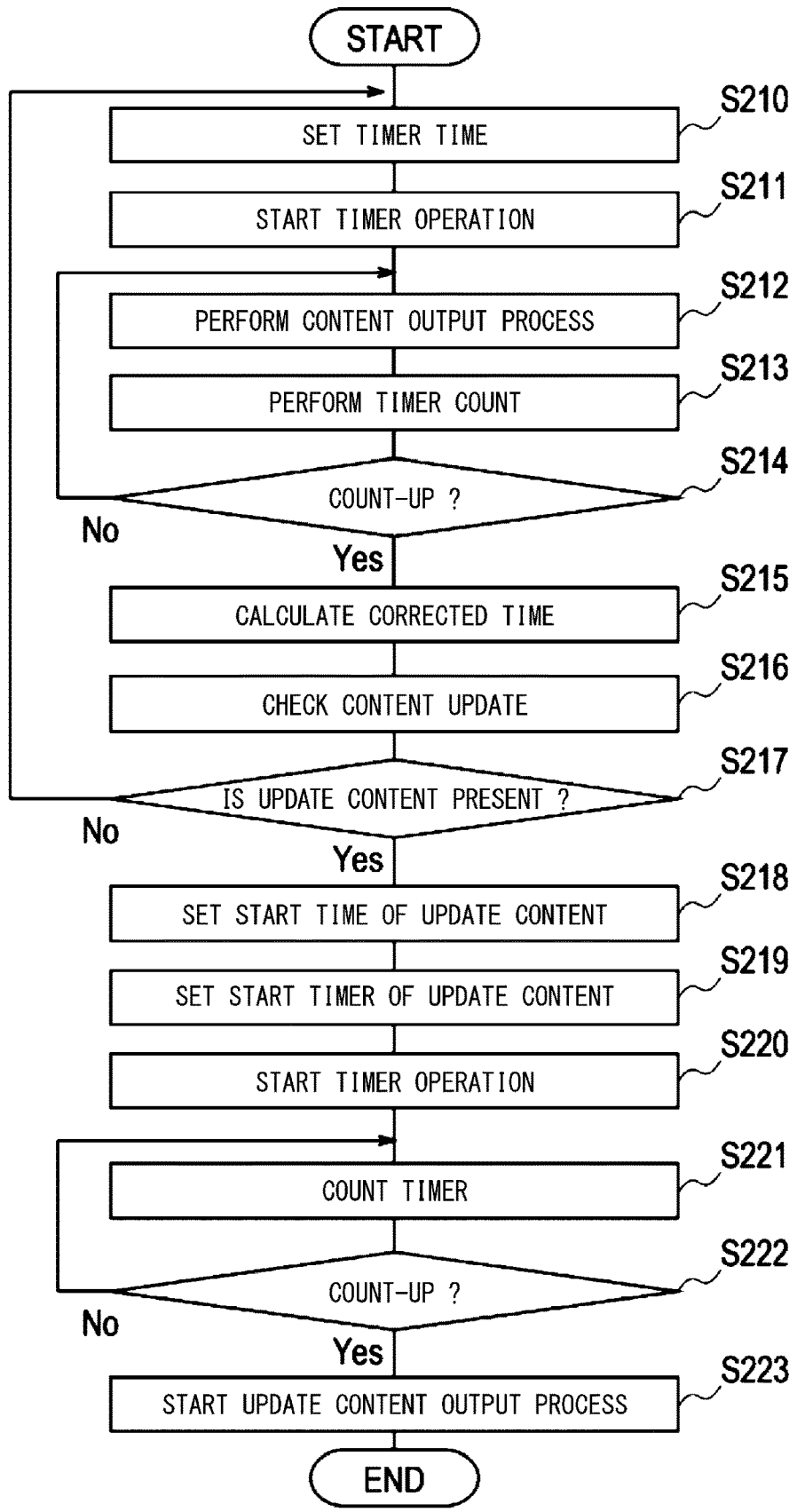
FIG. 7 is a flowchart of a content output process based on timer operation control according to an embodiment.

The content output process according to the timer operation control of S17 and S21 illustrated in FIGS. 4 and S117 illustrated in FIG. 6 will be described more specifically with reference to FIG. 7.

The content updating unit 125 sets a predetermined timer time in the timer unit 124 (S210), starts a timer operation (S211), and performs a content output process (S212). For example, the timer time is one second.

The timer unit 124 performs timer count (S213) and determines whether or not timer count-up has been performed, in other words, whether or not the timer time (for example, one second) has elapsed (S214). The content output process (S212) and the timer count (S213) are continued until the timer count-up is performed (No in S214).

When the timer count-up is performed (Yes in S214), in other words, here, when one second has elapsed, the time correcting unit 123 calculates a corrected time T' using the equation described above (S215). As described above, an error Y has occurred in a time after one second counted by the timer, in other words, the internal device time T. Thus, at the timing of timer count-up (here, every one second that is the timer time), a corrected time T' using the corrected time calculating equation described above is calculated.

In addition, the content updating unit 125 checks whether or not an update content is present (S216).

In a case in which no update content is present (No in S217), in other words, in a case in which the content output until now is continued, the process of timer time setting (S210) to the process of content update checking (S216) described above are performed again. The timer time setting is counted using the corrected time T' as a reference.

In a case in which an update content is present (Yes in S217), the content updating unit 125 sets a content start time acquired together with the update content (S218) and sets a start timer of the update content (S219).

The timer unit 124 starts a timer operation at the set timer time (here, one second) (S220), performs timer count (S221), and monitors whether or not count-up has been performed, in other words, whether or not one second has elapsed (S222). The timer count is continued until count-up has been performed (until one second has elapsed) (No in S222) (S221). When count-up has been performed (when one second has elapsed) (Yes in S222), the content updating unit 125 writes a new content into the video memory 132, thereby starting a process of outputting the update content (S223). The process of outputting the update content is a process that is the same as the process according to the corresponding flow.

In addition, in a case in which the signage player 1 does not perform content output with being synchronized with another signage player 1 (for example, in the case of being installed standalone) or in a case in which there is no designation of a start time, the processes of S218 to S222 are omitted.

In this way, also when the time function of the signage player 1 does not have an accurate time, the time is corrected for every set timer time, here, for every second. Thus, the content updating unit 125 can continuously update the content at a substantially accurate time (a time that can be regarded as being accurate). For example, in a case in which the timer accuracy is set as 1 ms/second, and time correction and content update are performed for every second, timer start, time correction, and content update can be performed with an error of 1 ms or less.

In this embodiment, although the operation of one signage player 1 has been described, even in the case of a plurality of signage players 1, each of the signage players 1 performs time correction for every predetermined time (in description presented above, every second) counted by a timer operation in accordance with an individual difference of hardware and installation environments (an operating temperature and the like), and thus, also in a case in which the same content is reproduced by the signage players 1, the content can be simultaneously switched with accuracy of the timer unit 124 or less.

Effects of Embodiment

Features of embodiments and effects thereof can be summed up as below.
(1) The signage player 1 includes:
the time function 122 that performs counting of the internal device time T;
the time correction calculating unit 121 that acquires a reference time t from the outside (for example, an NTS server, a GNSS, a radio clock, or the like) and synchronizes the internal device time T with the reference time t; and
the time correcting unit 123 that calculates a time correction coefficient G defined using a change rate of a time difference Y between the reference time t and the internal device time T (the error change rate $\Delta$) using the time correction coefficient G and calculates a corrected time T' of the internal device time T.

In accordance with this, the signage player 1 (a display device) suppressing a load accompanying access to a device that provides the reference time t of the outside (here, the NTP server) is provided.

From another point of view, also in a case in which the signage player 1 is configured using hardware of which the processing capability is not high, a burden of a time synchronization process can be configured to have no influence on content reproduction.

In addition, from another point of view, in a case in which the same content is reproduced by a plurality of signage players 1, a display difference between the signage players 1 can be inhibited. In other words, time differences of individual hardware differences of the signage players 1 can be corrected.

(2) The time correcting unit 123, at a power-off timing, calculates an error change rate $\Delta$ in a period from a timing synchronized with a time difference at the power-off timing to power off and stores the calculated error change rate $\Delta$ as a time correction coefficient G to be applied at a next power-on time.

The timing at which the time correction coefficient G (here, the error change rate $\Delta$) is calculated is the power-off time, and thus there is no influence on content reproduction according to the load and the like thereof. In addition, since the time correction coefficient G (here, the error change rate $\Delta$) is updated, time correction according to the environments (a temperature, a network load, and the like) of the signage player 1 can be performed.

(3) The time correcting unit 123 performs synchronization between the reference time t and the internal device time T only at a timing at which a power-on operation is performed and does not perform synchronization until power off.

At a power-on time, a time difference from the latest reference time t is calculated and applied, and thus a difference from the reference time t can be configured to be zero at the power-on time. In addition, since synchronization with the reference time t of the NTP server is performed only in case of power on, only one synchronization process is required, and, when content is reproduced, the influence of the load of the synchronization process on content reproduction can be excluded. In addition, also in a case in which a plurality of signage players 1 are connected to the same network, there is no influence on content reproduction due to an increase in the network load.

(4) The signage player 1 includes the timer unit 124 that has an internal clock and performs a timer operation, and the time correcting unit 123 calculates a corrected time T' for every predetermined time counted using the timer of the timer unit 124. In this way, the corrected time T' can be calculated within accuracy (within the error) of the timer unit 124.

(5) The content updating unit 125 that controls update of content to be displayed is provided, the content updating unit 125 determines update of the content described above for every predetermined time according to the timer operation of the timer unit 124, and a start time of the timer operation is counted on the basis of the corrected time T'.

In other words, the content updating unit 125 determines presence/absence of update of content for every predetermined time counted by the timer of the timer unit 124 and, after the determination of the update, instructs the timer unit 124 to start the timer. The update of content is checked by counting a local clock of the timer unit 124, and thus the influence on content reproduction due to accumulation of differences of the internal device time T can be excluded.

(6) There is provided a time correction method performed by the signage player 1, and the time correction method calculating a corrected time T' of the internal device time T by using a time correction coefficient G defined using a change rate of a time difference Y between the reference time t and the internal device time T of the signage player 1 (the error change rate $\Delta$).

In accordance with this, the signage player 1 suppressing a load accompanying access to a device that provides the reference time of the outside (here, the NTP server) is provided. In addition, also in a case in which the signage player 1 is configured using hardware of which the processing capability is not high, a burden of a time synchronization process can be configured to have no influence on content reproduction.

Furthermore, from another point of view, in a case in which the same content is reproduced by a plurality of signage players 1, a display difference between the signage players 1 can be inhibited. In other words, time differences of individual hardware differences of the signage players 1 can be corrected.

(7) There is provided a program executed in a display device, the program having a function of calculating a corrected time T' of the internal device time T by using a time correction coefficient G defined using a change rate of a time difference Y between the reference time t and the internal device time T of the signage player 1 (the error change rate $\Delta$).

In accordance with this, the signage player 1 of (1) described above and the time correction methods of (7) described above can be realized, and effects similar to those are acquired.

As above, although the embodiments of the present invention have been described with reference to the drawings, these are examples of the present invention, and various configurations other than those described above can be employed. In addition, in the flowchart used in the description presented above, although a plurality of steps (processes) are sequentially described, the execution order of steps executed in each embodiment is not limited to the order of the description. In each embodiment, the order of the illustrated steps can be changed in a range in which there is no problem in terms of details. In addition, the embodiments described above can be combined in a range in which details are not contradictory.

A part or the whole of the embodiments described above can be described as the following supplement notes but is not limited thereto.

A reproduction device includes: a timer configured to count an internal device time; a time correction calculator configured to acquire a reference time from the outside at a timing determined in advance and synchronize the internal device time with the reference time; and a time corrector configured to calculate a time correction coefficient defined using a change rate of a time difference between the reference time and the internal device time at a timing different from the timing determined in advance and calculate a corrected time acquired by correcting the internal device time using the time correction coefficient.

In some cases, the time corrector calculates the change rate of the time difference in a period from a timing synchronized with the time difference of a power-off timing to power off at a timing at which a power off operation is performed and stores the change rate as the time correction coefficient applied to a timing at which a next power-on operation is performed.

In some cases, the time correction calculator synchronizes the reference time and the internal device time with each other at a timing at which a power-on operation is performed and does not perform synchronization until a timing at which a power-off operation is performed after synchronization is performed once.

In some cases, the time corrector calculates a corrected time corresponding to a predetermined internal device time on the basis of the internal device time synchronized with the reference time at a timing at which a power-on operation is performed and the change rate.

In some cases, wherein if the time corrector does not have the change rate which is to be used for calculating the corrected time, the time corrector reflects only an error at the time of synchronization in the corrected time, calculates a change rate of a time difference in a predetermined period, and calculates the corrected time by reflecting the calculated change rate after the change rate is calculated.

In some cases, the reproduction device further includes a timer that has an internal clock and performs a timer operation, in which, the time corrector calculates the corrected time for every predetermined time counted by the timer.

In some cases, the reproduction device further includes a content updating unit configured to control update of content to be displayed, in which, the content updating unit determines update of the content for every predetermined time according to the timer operation of the timer, and a start time of the timer operation is set using the corrected time.

A time correction method is performed by a reproduction device. The time correction method includes calculating a corrected time of an internal device time of the reproduction device using a time correction coefficient determined using a change rate of a time difference between a reference time and the internal device time.

A computer readable storage medium that stores a program executed in a reproduction device, the program having a function of calculating a corrected time of an internal device time of the reproduction device using a time correction coefficient determined using a change rate of a time difference between a reference time and the internal device time.

REFERENCE SIGNS LIST 1 signage player
11 communication device
111 data receiving unit
112 data transmitting unit
12 data processing device
121 time correction calculating unit
122 time function
123 time correcting unit
124 timer unit
125 content updating unit
13 storage device
131 correction coefficient storing unit
132 video memory
14 video output device
141 video output unit

What is claimed is:

1. A reproduction device comprising:
a timer configured to count an internal device time;
a time correction calculator configured to acquire a reference time from outside at a timing determined in advance and to synchronize the internal device time with the reference time; and
a time corrector configured to calculate a time correction coefficient defined using a change rate of a time difference between the reference time and the internal device time at a timing different from the timing determined in advance, the time corrector configured to calculate a corrected time by correcting the internal device time using the time correction coefficient,
wherein the time corrector calculates the change rate of the time difference in a period from a timing synchronized with the time difference of a power-off timing to power off at a timing at which a power-off operation is performed and stores the change rate as the time correction coefficient applied to a timing at which a next power-on operation is performed.

2. The reproduction device according to claim 1, wherein the time correction calculator synchronizes the reference time and the internal device time with each other at a timing at which a power-on operation is performed and does not perform synchronization until a timing at which a power-off operation is performed after synchronization is performed once.

3. The reproduction device according to claim 1, wherein the time corrector calculates a corrected time corresponding to a predetermined internal device time on the basis of the internal device time synchronized with the reference time at a timing at which a power-on operation is performed and the change rate.

4. The reproduction device according to claim 1, wherein if the time corrector does not have the change rate which is to be used for calculating the corrected time, the time corrector reflects only an error at the time of synchronization in the corrected time, calculates a change rate of a time difference in a predetermined period, and calculates the corrected time by reflecting the calculated change rate after the change rate is calculated.

5. The reproduction device according to claim 1, further comprising:
a timer that has an internal clock and performs a timer operation, wherein the time corrector calculates the corrected time for every predetermined time counted by the timer.

6. The reproduction device according to claim 5, further comprising:
a content updating unit configured to control update of content to be displayed,
wherein the content updating unit determines update of the content for every predetermined time according to the timer operation of the timer, and
wherein a start time of the timer operation is set using the corrected time.

7. A time correction method performed by a reproduction device, the time correction method comprising:
calculating a corrected time of an internal device time of the reproduction device using a time correction coefficient determined using a change rate of a time difference between a reference time and the internal device time;
calculating the change rate of the time difference in a period from a timing synchronized with the time difference of a power-off timing to power off at a timing at which a power-off operation is performed; and
storing the change rate as the time correction coefficient applied to a timing at which a next power-on operation is performed.

8. A time correction method performed by a reproduction device, the time correction method comprising:
calculating a corrected time of an internal device time of the reproduction device using a time correction coefficient determined using a change rate of a time difference between a reference time and the internal device time; and
calculating a corrected time corresponding to a predetermined internal device time on the basis of the internal device time synchronized with the reference time at a timing at which a power-on operation is performed and the change rate.

* * * * *